US010945514B2

(12) United States Patent
Saito et al.

(10) Patent No.: US 10,945,514 B2
(45) Date of Patent: Mar. 16, 2021

(54) INFORMATION PROCESSING APPARATUS, INFORMATION PROCESSING METHOD, AND COMPUTER-READABLE STORAGE MEDIUM

(71) Applicant: SONY CORPORATION, Tokyo (JP)

(72) Inventors: Mari Saito, Kanagawa (JP); Tatsuki Kashitani, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/980,630

(22) Filed: Dec. 28, 2015

(65) Prior Publication Data

US 2016/0128450 A1 May 12, 2016

Related U.S. Application Data

(63) Continuation of application No. 13/400,980, filed on Feb. 21, 2012, now abandoned.

(30) Foreign Application Priority Data

Mar. 1, 2011 (JP) ................................ 2011-044274

(51) Int. Cl.
*A45D 44/00* (2006.01)
*G06F 3/01* (2006.01)
(Continued)

(52) U.S. Cl.
CPC ........... *A45D 44/005* (2013.01); *G06F 3/014* (2013.01); *G06F 3/0481* (2013.01); (Continued)

(58) Field of Classification Search
None
See application file for complete search history.

(56) References Cited

U.S. PATENT DOCUMENTS 5,478,238 A * 12/1995 Gourtou ............... A45D 44/005 434/100
5,520,203 A * 5/1996 Segerstrom .......... A45D 44/005 132/293

(Continued)

FOREIGN PATENT DOCUMENTS

JP 2001-186923 7/2001
JP 2006-133856 5/2006

(Continued)

OTHER PUBLICATIONS

Ma et al. "Method for Operating Makeup Robot Based on Expert Knowledge and System Thereof" Application No. 10-2010-0130126, Application Date. Dec. 17, 2010, machine translated.*

(Continued)

*Primary Examiner* — Saptarshi Mazumder
(74) *Attorney, Agent, or Firm* — Paratus Law Group, PLLC

(57) ABSTRACT

A method is provided for generating output image data. The method comprises receiving image data representing an input image, the input image containing at least one facial image. The method further comprises recognizing the facial image in the image data, and recognizing facial features of the facial image. The method further comprises generating data representing a makeup image based on the recognized facial features, the makeup image providing information assisting in the application of makeup. The method also comprises generating output image data representing the makeup image superimposed on the facial image.

21 Claims, 16 Drawing Sheets

| Pattern ID | Context ID | Process | Item ID | Tool ID | Action ID | Parts ID | Pressure | Motion | Direction | Distance | Length |
|---|---|---|---|---|---|---|---|---|---|---|---|
| P-00001 | 002 | 001 | I-201 | T-221 | A-001 | | 20 | | | | |
| | | 002 | I-201 | T-221 | A-002 | P-002 | 12 | 02 | 34 | 0 | 21 |
| | | 003 | | | | | | | | | |
| | | | | | | | | | | | |

(51) Int. Cl.
*G06F 3/0481* (2013.01)
*G06T 19/00* (2011.01)
*G06K 9/00* (2006.01)
*G06T 11/00* (2006.01)

(52) U.S. Cl.
CPC ..... *G06K 9/00221* (2013.01); *G06K 9/00664* (2013.01); *G06T 11/00* (2013.01); *G06T 19/00* (2013.01); *G06T 19/006* (2013.01); *A45D 2044/007* (2013.01)

(56) References Cited

U.S. PATENT DOCUMENTS

| | | | | |
|---|---|---|---|---|
| 6,502,583 | B1 * | 1/2003 | Utsugi | A61K 8/02 132/200 |
| 7,054,668 | B2 * | 5/2006 | Endo | A45D 42/00 348/E7.08 |
| 2002/0019755 | A1 * | 2/2002 | Kagami | G06Q 10/02 705/5 |
| 2002/0024528 | A1 * | 2/2002 | Lambertsen | A45D 44/005 345/646 |
| 2002/0196333 | A1 * | 12/2002 | Gorischek | H04N 7/18 348/61 |
| 2003/0065578 | A1 * | 4/2003 | Peyrelevade | A45D 44/005 705/14.54 |
| 2004/0110113 | A1 * | 6/2004 | Huang | G09B 19/00 434/100 |
| 2004/0257439 | A1 * | 12/2004 | Shirai | A61B 5/0059 348/77 |
| 2005/0135675 | A1 * | 6/2005 | Chen | G06T 11/00 382/162 |
| 2005/0175234 | A1 * | 8/2005 | Sakamoto | A47F 10/00 382/154 |
| 2006/0132506 | A1 | 6/2006 | Utsugi | |
| 2006/0147119 | A1 | 7/2006 | Takano et al. | |
| 2006/0178904 | A1 * | 8/2006 | Aghassian | A45D 44/005 705/1.1 |
| 2006/0281053 | A1 * | 12/2006 | Medcalf | G09B 19/10 434/94 |
| 2007/0019882 | A1 * | 1/2007 | Tanaka | G06T 17/20 382/276 |
| 2007/0050639 | A1 | 3/2007 | Nakano et al. | |
| 2008/0040344 | A1 * | 2/2008 | Hayama | G06F 16/93 |
| 2008/0136895 | A1 | 6/2008 | Mareachen | |
| 2008/0192980 | A1 | 8/2008 | Park et al. | |
| 2008/0230086 | A1 * | 9/2008 | Murphy | A45D 40/06 132/320 |
| 2009/0309826 | A1 | 12/2009 | Jung et al. | |
| 2010/0215599 | A1 | 8/2010 | Giron et al. | |
| 2010/0226531 | A1 * | 9/2010 | Goto | G06T 11/00 382/103 |
| 2011/0128395 | A1 * | 6/2011 | Choi | G06K 9/00281 348/222.1 |
| 2011/0211047 | A1 | 9/2011 | Chhibber et al. | |
| 2011/0284019 | A1 * | 11/2011 | Fairweather | A46B 9/021 132/200 |
| 2012/0105336 | A1 * | 5/2012 | Chuang | H04N 13/04 345/173 |

FOREIGN PATENT DOCUMENTS

| | | |
|---|---|---|
| JP | 2009-53981 | 3/2009 |
| JP | 2009-064423 | 3/2009 |
| JP | 2011-008397 | 1/2011 |
| WO | WO2008/102440 A1 | 8/2008 |

OTHER PUBLICATIONS

Hyeong et al. "Voxel Map Generator and Method Thereof",dated Oct. 11, 2010, Machine translated Application No. 10-2010-0098927.*

Davison; "Real-Time Simultaneous Localisation and Mapping With a Single Camera", Proceedings of the 9$^{th}$ IEEE International Conference on Computer Vision, vol. 2, pp. 1-8, (2003).

* cited by examiner

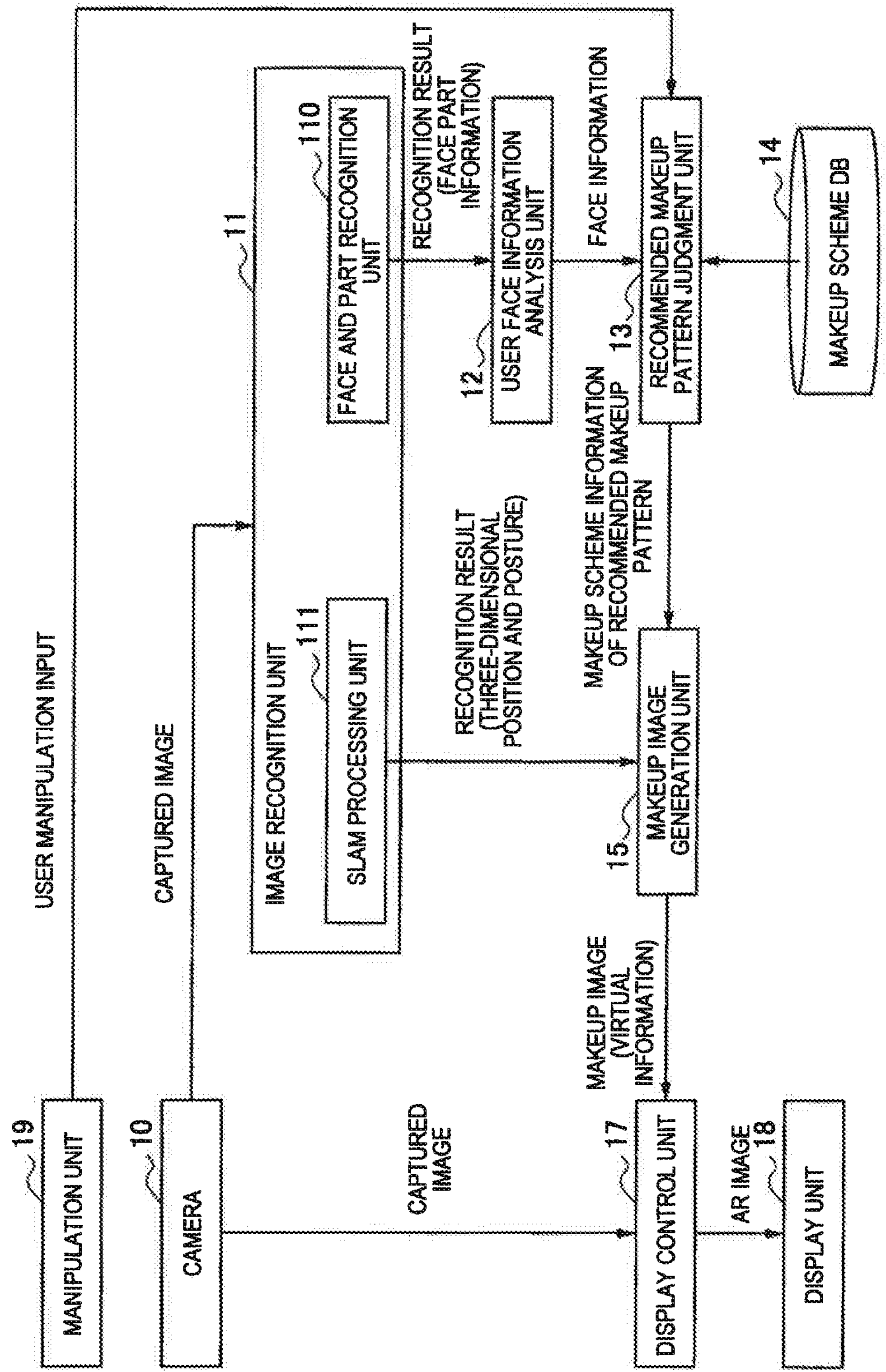

FIG. 2
USER MANIPULATION INPUT
CAPTURED IMAGE
IMAGE RECOGNITION UNIT
11
110
FACE AND PART RECOGNITION UNIT
111
SLAM PROCESSING UNIT
RECOGNITION RESULT (FACE PART INFORMATION)
RECOGNITION RESULT (THREE-DIMENSIONAL POSITION AND POSTURE)
12
USER FACE INFORMATION ANALYSIS UNIT
FACE INFORMATION
13
RECOMMENDED MAKEUP PATTERN JUDGMENT UNIT
14
MAKEUP SCHEME DB
MAKEUP SCHEME INFORMATION OF RECOMMENDED MAKEUP PATTERN
15
MAKEUP IMAGE GENERATION UNIT
MAKEUP IMAGE (VIRTUAL INFORMATION)
19
MANIPULATION UNIT
10
CAMERA
CAPTURED IMAGE
17
DISPLAY CONTROL UNIT
AR IMAGE
18
DISPLAY UNIT

FIG. 3

| Pattern ID | Context ID | Process | Item ID | Tool ID | Action ID | Parts ID | Pressure | Motion | Direction | Distance | Length |
|---|---|---|---|---|---|---|---|---|---|---|---|
| P-00001 | 002 | 001 | I-201 | T-221 | A-001 | | 20 | | | | |
| | | 002 | I-201 | T-221 | A-002 | P-002 | 12 | 02 | 34 | 0 | 21 |
| | | 003 | | | | | | | | | |
| | | | | | | | | | | | |

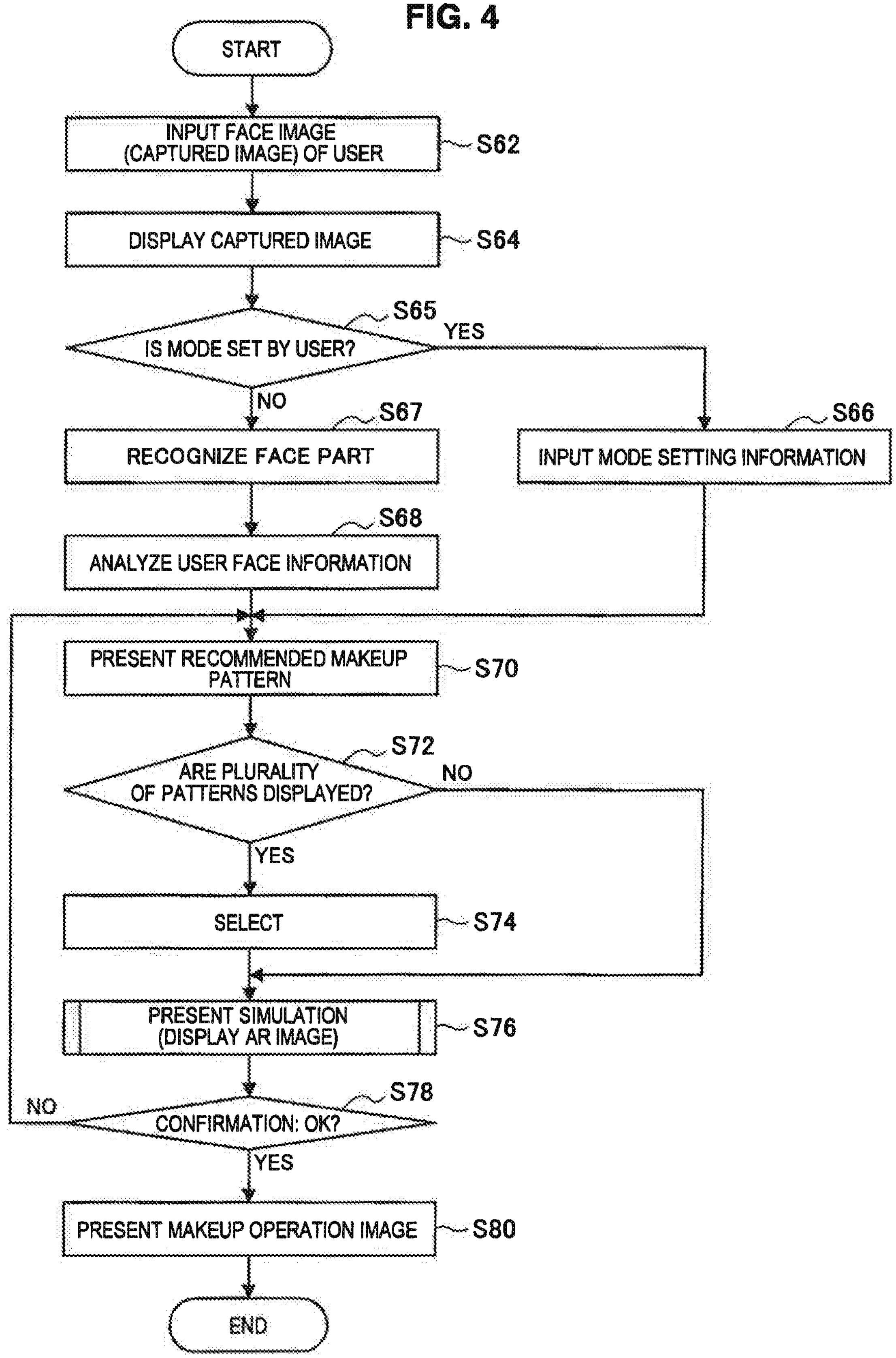
FIG. 4
START
INPUT FACE IMAGE (CAPTURED IMAGE) OF USER
S62
DISPLAY CAPTURED IMAGE
S64
S65
IS MODE SET BY USER?
YES
NO
S67
RECOGNIZE FACE PART
S66
INPUT MODE SETTING INFORMATION
S68
ANALYZE USER FACE INFORMATION
PRESENT RECOMMENDED MAKEUP PATTERN
S70
S72
ARE PLURALITY OF PATTERNS DISPLAYED?
NO
YES
SELECT
S74
PRESENT SIMULATION (DISPLAY AR IMAGE)
S76
S78
NO
CONFIRMATION: OK?
YES
PRESENT MAKEUP OPERATION IMAGE
S80
END 181
182a
182b
182c
183
184
185

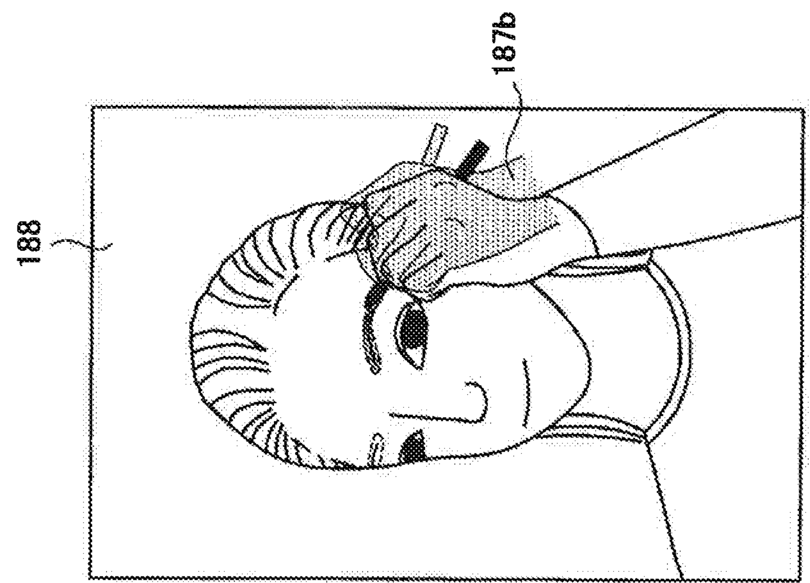
FIG. 8
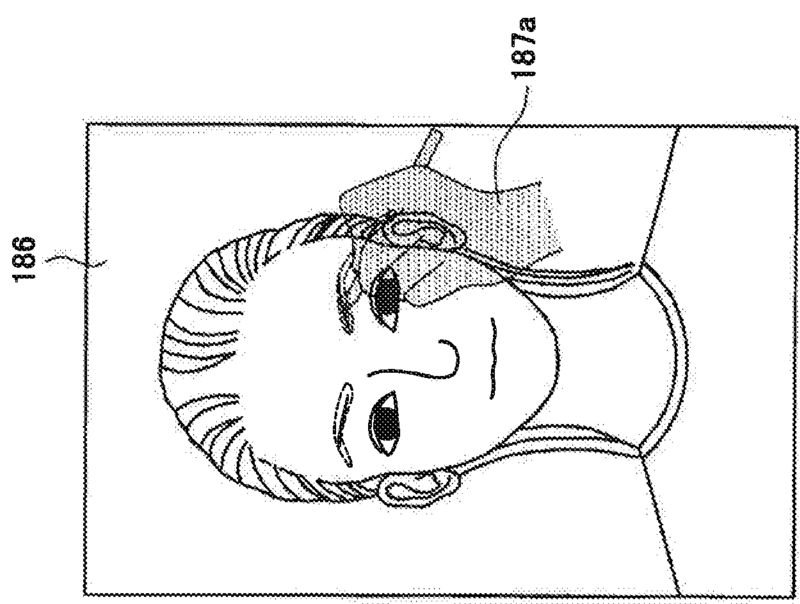

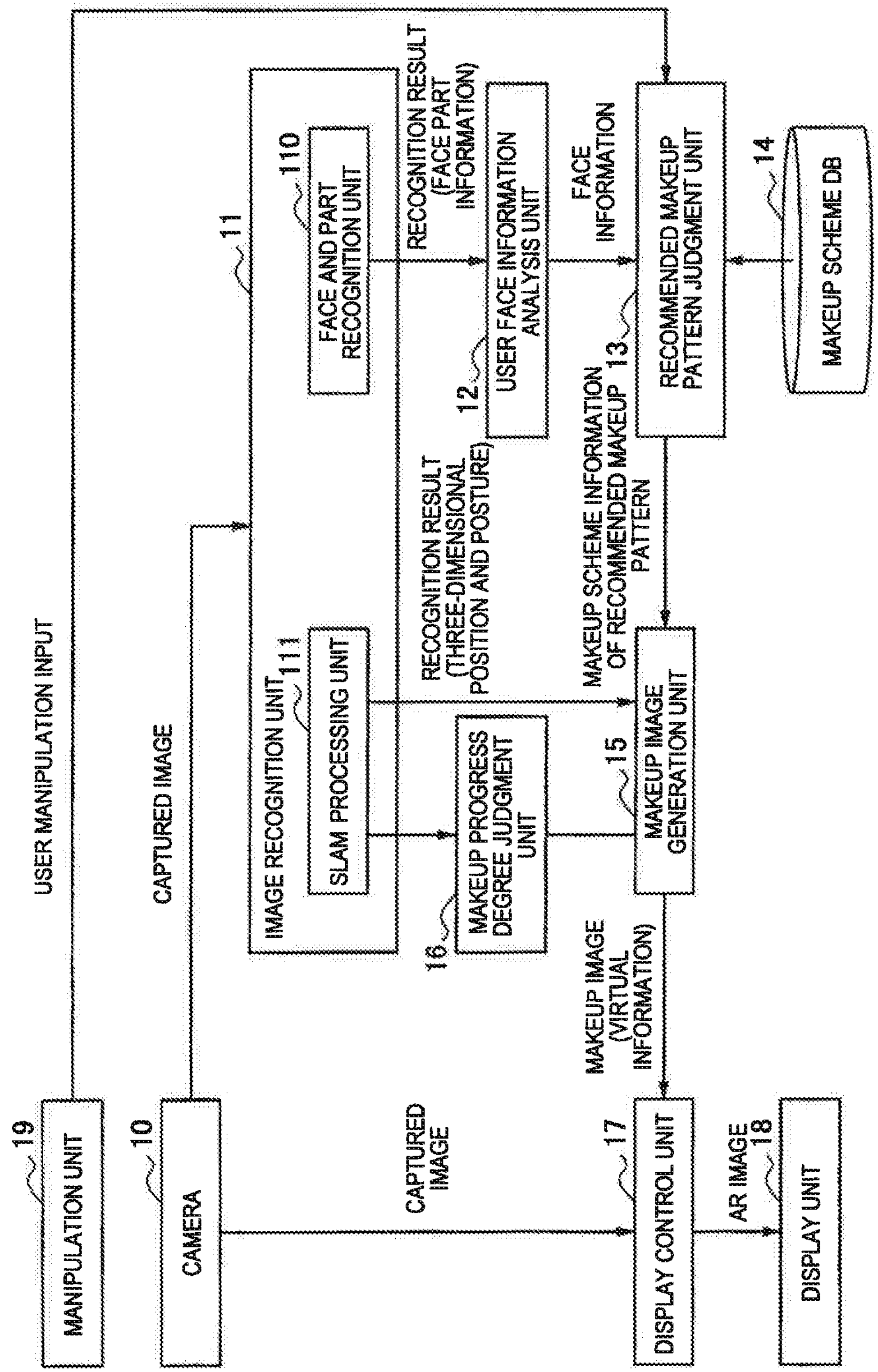

FIG. 9
19
MANIPULATION UNIT
10
CAMERA
USER MANIPULATION INPUT
CAPTURED IMAGE
11
IMAGE RECOGNITION UNIT
110
FACE AND PART RECOGNITION UNIT
111
SLAM PROCESSING UNIT
RECOGNITION RESULT (FACE PART INFORMATION)
RECOGNITION RESULT (THREE-DIMENSIONAL POSITION AND POSTURE)
12
USER FACE INFORMATION ANALYSIS UNIT
FACE INFORMATION
13
RECOMMENDED MAKEUP PATTERN JUDGMENT UNIT
14
MAKEUP SCHEME DB
MAKEUP SCHEME INFORMATION OF RECOMMENDED MAKEUP PATTERN
16
MAKEUP PROGRESS DEGREE JUDGMENT UNIT
15
MAKEUP IMAGE GENERATION UNIT
MAKEUP IMAGE (VIRTUAL INFORMATION)
CAPTURED IMAGE
17
DISPLAY CONTROL UNIT
AR IMAGE
18
DISPLAY UNIT

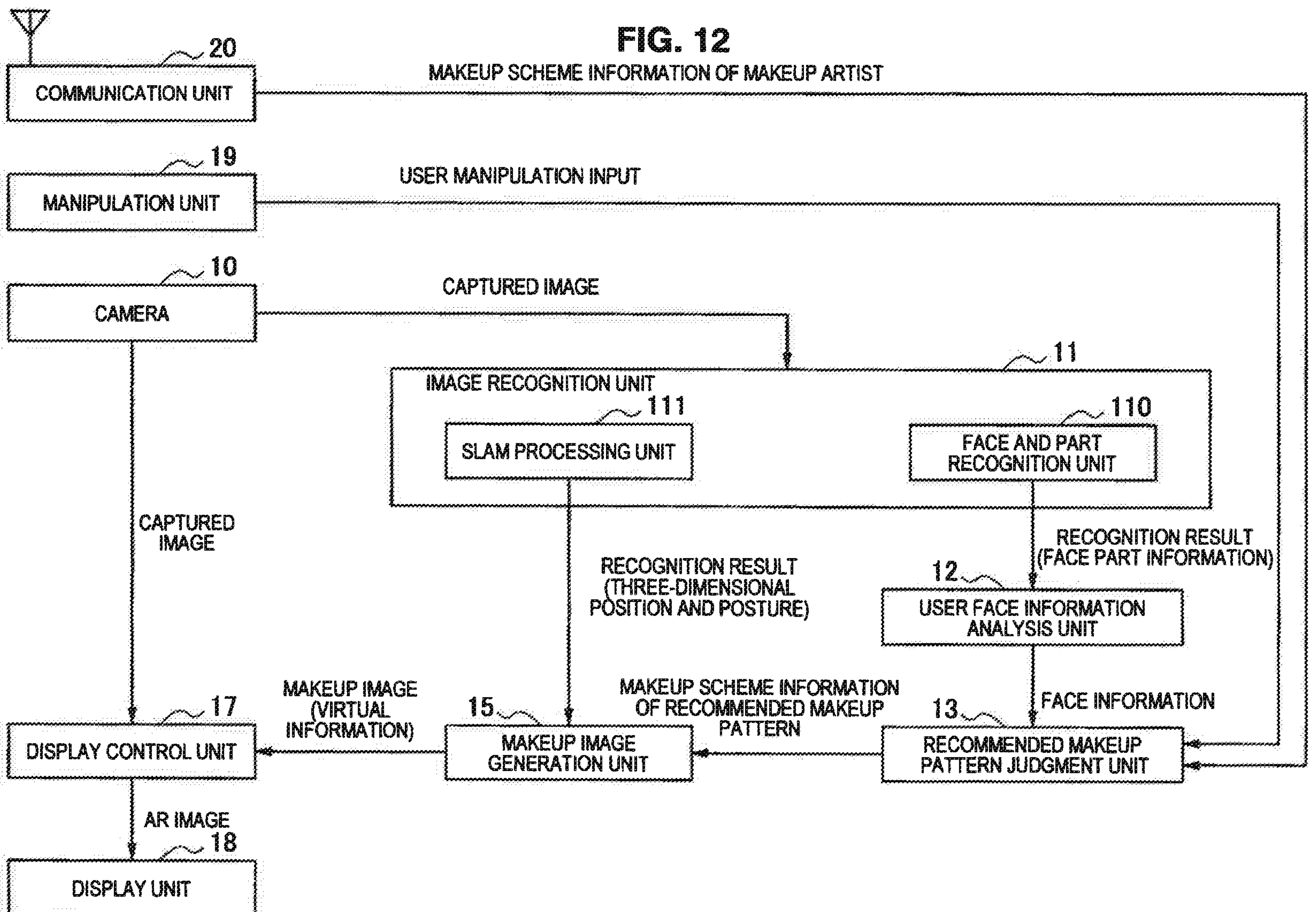
FIG. 12
20
COMMUNICATION UNIT
MAKEUP SCHEME INFORMATION OF MAKEUP ARTIST
19
MANIPULATION UNIT
USER MANIPULATION INPUT
10
CAMERA
CAPTURED IMAGE
11
IMAGE RECOGNITION UNIT
111
SLAM PROCESSING UNIT
110
FACE AND PART RECOGNITION UNIT
CAPTURED IMAGE
RECOGNITION RESULT (THREE-DIMENSIONAL POSITION AND POSTURE)
RECOGNITION RESULT (FACE PART INFORMATION)
12
USER FACE INFORMATION ANALYSIS UNIT
FACE INFORMATION
17
DISPLAY CONTROL UNIT
MAKEUP IMAGE (VIRTUAL INFORMATION)
15
MAKEUP IMAGE GENERATION UNIT
MAKEUP SCHEME INFORMATION OF RECOMMENDED MAKEUP PATTERN
13
RECOMMENDED MAKEUP PATTERN JUDGMENT UNIT
AR IMAGE
18
DISPLAY UNIT

INFORMATION PROCESSING APPARATUS, INFORMATION PROCESSING METHOD, AND COMPUTER-READABLE STORAGE MEDIUM

CROSS-REFERENCE TO RELATED APPLICATIONS

This application is a continuation of U.S. patent application Ser. No. 13/400,980 (filed on Feb. 21, 2012), which claims priority to Japanese Patent Application No. 2011-044274 (filed on Mar. 1, 2011), which are all hereby incorporated by reference in their entirety.

BACKGROUND

Description of the Related Art

The present disclosure relates to an information processing apparatus, an information processing method, an information processing system, and a program.

As schemes for supporting makeup, various makeup simulations for simulating a state after makeup completion have been proposed.

For example, a method of displaying a simulation image obtained by changing a state of roughness of skin such as wrinkles or pores in a skin image of a user has been proposed in Japanese Patent Laid-open Publication No. 2006-133856. Accordingly, a noticeable degree of improvement for the wrinkles or the pores can be presented by using specific cosmetics. Further, an auxiliary apparatus for visualizing an impression of makeup in various lighting states in consideration of different impressions of makeup under indoor artificial light and outdoor natural light has been proposed in Japanese Patent Laid-open Publication No. 2001-186923. Accordingly, the user can select the best makeup for any event.

Further, a makeup simulation apparatus for generating a state in which desired cosmetics have been applied by acquiring a two-dimensional face image of a subject, deforming a standard application shape, and synthesizing the deformed standard application shape with the face image of the subject has been proposed in Japanese Patent Laid-open Publication No. 2009-53981.

Technical Problem

However, since a synthesized image generated by the above-described makeup simulation is a still image from a front face, it is difficult to confirm makeup simulation from several angles in real time. Further, although a state after makeup completion can be confirmed, it is difficult to enter a simulated state by a user actually doing makeup. Accordingly, it is necessary to further improve a makeup support scheme such as makeup simulation.

Therefore, it is desirable to provide a novel and improved information processing apparatus, information processing method, and computer-readable storage medium capable of improving a makeup support scheme.

SUMMARY

Accordingly, there is provided an apparatus for generating output image data. The apparatus comprises a receiving unit configured to receive image data representing an input image, the input image containing at least one facial image. The apparatus further comprises a recognition unit configured to recognize the facial image in the image data, and recognize facial features of the facial image. The apparatus further comprises a makeup image generation unit configured to generate data representing a makeup image based on the recognized facial features, the makeup image providing information assisting in the application of makeup. The apparatus also comprises a display generation unit configured to generate output image data representing the makeup image superimposed on the facial image.

In another aspect, there is provided a method for generating output image data. The method comprises receiving image data representing an input image, the input image containing at least one facial image. The method further comprises recognizing the facial image in the image data, and recognizing facial features of the facial image. The method further comprises generating data representing a makeup image based on the recognized facial features, the makeup image providing information assisting in the application of makeup. The method also comprises generating output image data representing the makeup image superimposed on the facial image.

In another aspect, there is provided a tangibly-embodied non-transitory computer-readable storage medium storing instructions which, when executed by a processor, cause a computer to perform a method for generating output image data. The method comprises receiving image data representing an input image, the input image containing at least one facial image. The method further comprises recognizing the facial image in the image data, and recognizing facial features of the facial image. The method further comprises generating data representing a makeup image based on the recognized facial features, the makeup image providing information assisting in the application of makeup. The method also comprises generating output image data representing the makeup image superimposed on the facial image.

In yet another aspect, there is provided an apparatus for generating output image data. The apparatus comprises receiving means for receiving image data representing an input image, the input image containing at least one facial image. The apparatus further comprises recognition means for recognizing the facial image in the image data, and recognizing facial features of the facial image. The apparatus further comprises makeup image generation means for generating data representing a makeup image based on the recognized facial features, the makeup image providing information assisting in the application of makeup. The apparatus also comprises display generation means for generating output image data representing the makeup image superimposed on the facial image According to the embodiments described above, there are provided an information processing apparatus, information processing method, and computer-readable storage medium, for improving a makeup support scheme.

BRIEF DESCRIPTION OF THE DRAWINGS

FIG. 2 is a block diagram showing an example of a configuration of the makeup support apparatus according to the first embodiment;

FIG. 3 is a flowchart showing a makeup support process performed by the makeup support apparatus according to the first embodiment;

FIG. 4 is a flowchart illustrating a simulation presenting process shown in FIG. 3;

FIG. 8 is a diagram illustrating an example of display control of the makeup support apparatus according to the first embodiment;

FIG. 9 is a block diagram showing an example of a configuration of a makeup support apparatus in variant 1;

FIG. 12 is a diagram showing an example of a configuration of the makeup support apparatus according to the second embodiment;

DETAILED DESCRIPTION OF THE EMBODIMENT(S)

Figure 1:
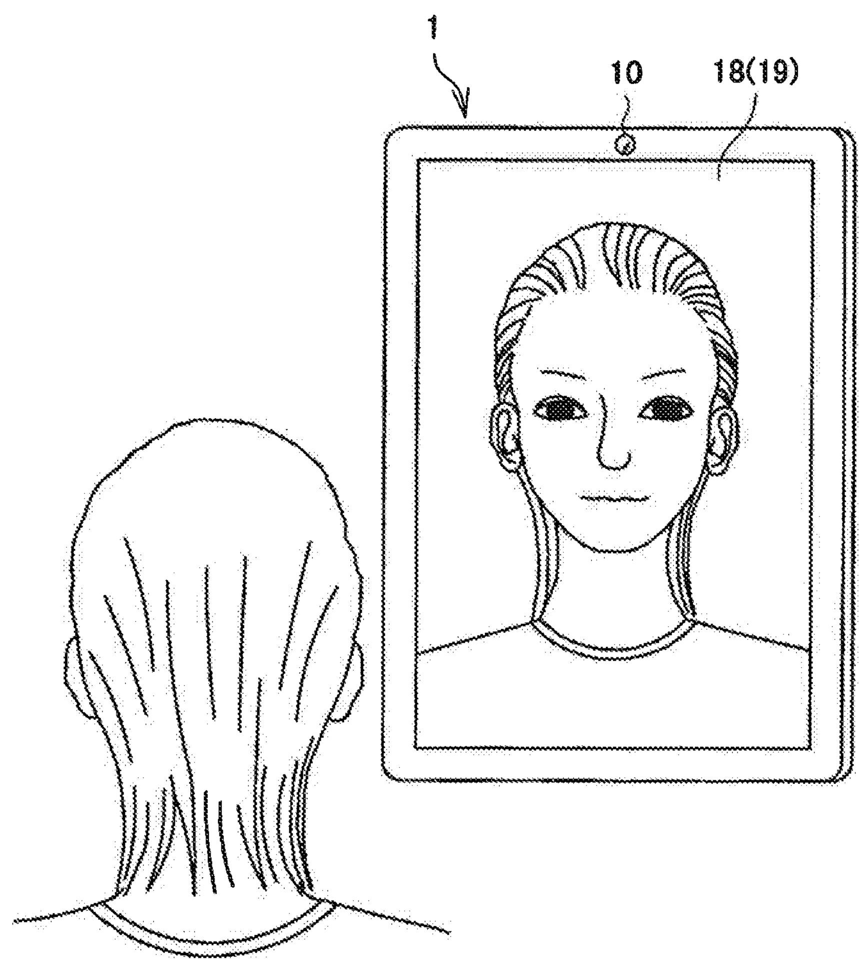
FIG. 1 is a diagram showing an overview of a makeup support apparatus according to a first embodiment.

In the following, embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

It is to be noted that the description is set forth below in accordance with the following order.

1. First Embodiment
   (1-1) Overview of Makeup Support Apparatus
   (1-2) Example of Configuration of Makeup Support Apparatus
   (1-3) Example of Flow of Process
   (1-4) Example of AR Image
   (1-5) Variant
2. Second Embodiment
3. Third Embodiment
4. Fourth Embodiment
5. Fifth Embodiment
6. Sixth Embodiment
7. Summary In recent years, technology called augmented reality (AR) for superimposing additional information onto the real world and presenting the information to a user has been attracting attention. In the AR technology, the information presented to the user may be visualized using various forms of virtual objects such as text, icons or animation. A primary application field of the AR technology is the support of user activities in the real world. In the following, the AR technology is applied to a makeup support scheme. This can improve a makeup scheme of a user.

The makeup support scheme using the AR technology is applicable to a makeup support system for simulating a state after makeup completion and presenting a simulation result to a user. Further, in the system, the makeup support scheme using the AR technology displays a procedure during makeup as well as after makeup completion in consideration of the difficulty a general user has in applying actual makeup according to the simulation, thereby further improving the makeup support scheme.

A system for improving a makeup scheme using a makeup support apparatus that is an example of an information processing apparatus will be described in <1. First Embodiment> to <6. Sixth Embodiment>.

1. First Embodiment

(1-1) Overview of Makeup Support Apparatus

First, an overview of a makeup support apparatus 1 according to a first embodiment will be described with reference to FIG. 1. As shown in FIG. 1, the makeup support apparatus according to the present embodiment is a tablet-type terminal including a touch panel display. Accordingly, a display unit 18 not only has a display function, but also a function of a manipulation unit 19 for receiving a manipulation input from a user. In an example shown in FIG. 1, a face image of the user is captured by a camera 10 provided in the makeup support apparatus 1. An AR image in which a virtual makeup image is superimposed on the face image is displayed on the display unit 18. Here, the face image of the user is an image in a real space, and the makeup image is a virtual object superimposed on a video of the real space.

The series of control processes carried out by the makeup support apparatus 1 described in the present specification may be realized using hardware, software, or a combination of hardware and software. Instructions for performing the series of control processes may be stored in advance on a tangibly embodied non-transitory computer-readable storage medium, such as a hard disk drive, provided inside or outside the respective apparatus. During execution, the instructions may be written into RAM (Random Access Memory) and executed by a processor such as a CPU (Central Processing Unit).

The virtual makeup image includes, for example, a makeup completion image indicating a makeup completion state (i.e., a completed makeup operation performed according to a makeup procedure) or a makeup action image used to indicate a makeup procedure or method during makeup application. The user can confirm a state after makeup completion in advance by viewing the AR image in which a makeup completion image is superimposed on the face image of the user. In particular, the makeup action image is displayed to be superimposed on a real face part of the user so that the makeup procedure or method during makeup application is statically or dynamically displayed. As the makeup procedure is dynamically displayed to be superimposed on the face part of the user, the user can recognize a motion of his or her hand when applying makeup. Accordingly, the user can easily apply makeup by merely moving their hand as indicated by the makeup action image, while viewing an AR image in which the makeup action image is superimposed on the face image. Accordingly, the user makeup scheme is more improved compared to makeup advice using language. Here, the image captured by the camera 10 is displayed to be reversed to left and right on the display unit 18. Accordingly, the user views his or her face as shown on a makeup mirror. The AR image displayed on the display unit 18 will be described in detail with reference to FIGS. 6 to 8 in "(1-4) Example of AR Image," which will be described later.

(1-2) Example of Configuration of Makeup Support Apparatus

Next, an example of a configuration of the makeup support apparatus 1 according to the present embodiment will be described with reference to FIG. 2. As shown in FIG. 2, the makeup support apparatus 1 includes a camera 10 (i.e., a receiving unit), an image recognition unit 11, a user face information analysis unit 12, a recommended makeup pattern judgment unit 13, a makeup scheme DB 14, a makeup image generation unit 15, a display control unit 17 (i.e., a display generation unit), a display unit 18 and a manipulation unit 19. The image recognition unit 11 includes a face and part recognition unit 110 and an SLAM processing unit 111. As used herein the term "unit" may be a software module, a hardware module, or a combination of a software module and a hardware module. Such hardware and software modules may be embodied in discrete circuitry, an integrated circuit, or as instructions executed by a processor.

Figure 6:
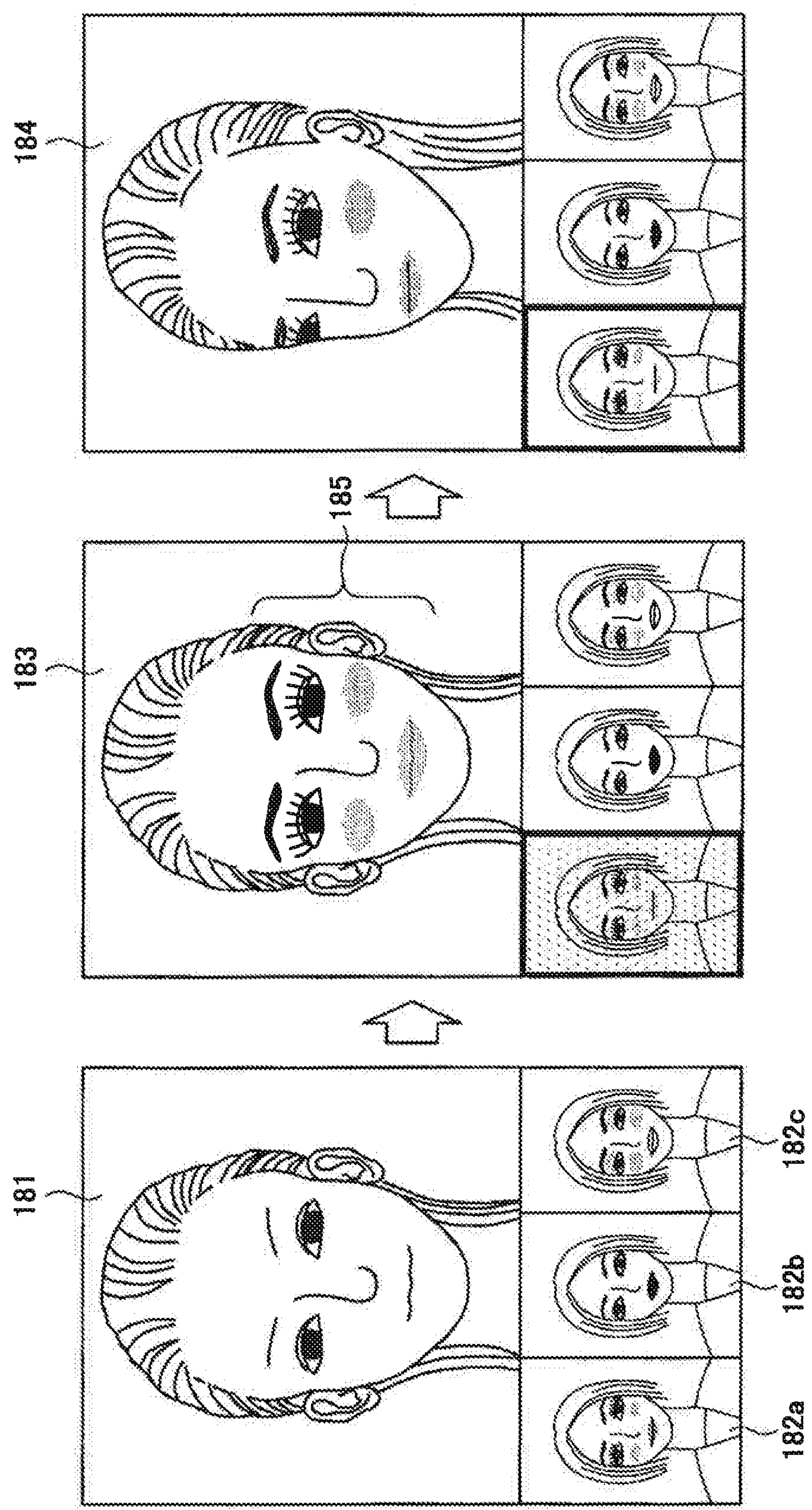
FIG. 6 is a diagram showing a positional relationship between the makeup support apparatus according to the first embodiment and a user.

The camera 10 is an example of an imaging unit for acquiring an image (video) by imaging a real space. The camera 10 captures a face image of the user. The user faces the makeup support apparatus 1 when applying makeup using the makeup support apparatus 1. Accordingly, the camera 10 provided in the makeup support apparatus 1 captures a face of the user. The camera 10 outputs the captured image to the image recognition unit 11. For example, as an example of the image obtained by imaging the face of the user, an image (video) 181 shown to the left in FIG. 6 is output to the image recognition unit 11.

The image recognition unit 11 performs an image recognition process on the captured image acquired from the camera 10. Specifically, first, a face in the captured image is recognized by the face and part recognition unit 110 of the image recognition unit 11. Once the face is recognized, parts of the face are recognized. The face and part recognition unit 110 may recognize the face and the face parts using a known image recognition scheme such as pattern recognition. The face and part recognition unit 110 outputs recognition results (the face parts and face part position information) to the user face information analysis unit 12. Further, the face and part recognition unit 110 may judge to have recognized the face in the captured image even after recognizing the presence of a portion of the face, such as the shoulder, neck, head, hair, or the like of the user in the captured image.

Further, three-dimensional positions and postures of the face and the face parts or a three-dimensional position and posture of the camera 10 are recognized by the SLAM processing unit 111 of the image recognition unit 11 according to a principle of SLAM (Simultaneous Localization and Mapping) technology disclosed in, for example, Andrew J. Davison's "Real-Time Simultaneous Localization and Mapping with a Single Camera," (Proceedings of the 9th IEEE International Conference on Computer Vision Volume 2, 2003, pp. 1403-1410). Accordingly, even when the face parts such as eyes or mouth are hidden by the hand or a direction of the face is changed while the user is applying makeup, the SLAM processing unit 111 can follow the motion of the face by tracking a position in a next image to which an initially or subsequently recognized face part, such as the eyes or mouth, has moved in order to recognize positions of the face parts.

The user face information analysis unit 12 analyzes face information based on the recognition result (face part information) output from the face and part recognition unit 110. Specifically, information on texture such as skin quality, skin texture and hair texture or information on a shape such as contour, layout of parts and hairdo is analyzed from the face part position and the face part image contained in the face part information. The user face information analysis unit 12 outputs the analyzed face information to the recommended makeup pattern judgment unit 13.

Makeup scheme information for each pattern is stored in the makeup scheme DB (database) 14. The recommended makeup pattern judgment unit 13 judges a makeup pattern to be recommended for the face information acquired from the user face information analysis unit 12 based on the makeup scheme information stored in the makeup scheme DB 14.

As the recommended makeup pattern, a makeup pattern suitable for a general trend as well as a small region- or age-based community to which a user belongs may be recommended. A region, an age or the like to which the user belongs is input as user information by the user. Alternatively, a sex may be input and a makeup pattern suitable for a man may be recommended.

FIG. 3 is a diagram showing an example of the makeup scheme information. The makeup scheme information contains data of pattern ID: an ID of a makeup pattern, context ID: an ID of a makeup objective or environment such as usual, party or outdoor, process: number of a procedure, Item ID: an ID of cosmetics (products), tool ID: an ID of a tool such as a puff or a brush, action ID: IDs of operations such as paint, slap, or push for the tool, part ID: an ID of part of a face such as eyes or eyebrows, pressure: pressure on a tool, direction: a tool operation direction, motion: movement of the tool, distance: a deviation from a reference face part, and length: a length (distance) at which cosmetics are applied, as shown in FIG. 3.

The context ID is information used when a user performs mode setting to set a makeup objective or environment in advance. The recommended makeup pattern judgment unit 13 judges a recommended makeup pattern by referencing a set mode, in addition to the face information. Alternatively, the judgment of the recommended makeup pattern may be a judgment to determine a recommendation order. In this case, for example, three upper makeup patterns are presented to the user as recommended makeup patterns, and if the user does not select any one from the makeup patterns, three subsequent makeup patterns are also presented as the recommended makeup pattern.

Makeup scheme information shown in FIG. 3 is information indicating a makeup method (operation), but may be used to generate a makeup completion image. The recommended makeup pattern judgment unit 13 outputs the makeup scheme information for the recommended makeup pattern to the image generation unit 15. Alternatively, the recommended makeup pattern judgment unit 13 may output an ID of the recommended makeup pattern and the image generation unit 15 may acquire the makeup scheme information for the recommended makeup pattern from the makeup scheme DB based on the ID.

The image generation unit 15 draws a makeup image that is virtual information superimposed on the captured image based on the makeup scheme information for the recommended makeup pattern, and deforms the makeup image according to the position and posture of the face parts contained in the recognition result (three-dimensional position and posture) of the SLAM processing unit 111. Alternatively, the image generation unit 15 may deform the makeup image using the recognition result (face part information) output from the face and part recognition unit 110. The makeup image generated by the image generation unit 15 will be described in detail in "(1-4) Example of AR Image." The image generation unit 15 outputs the generated makeup image to the display control unit 17.

The display control unit 17 generates output image data and displays an AR image in which a virtual makeup image is superimposed on an image obtained by imaging the real space on the display unit 18. Accordingly, the user can view the operation of makeup applied to the face image or the face after applying makeup, which is displayed on the display unit 18.

(1-3) Example of Flow of Process

Next, a flow of a process in the makeup support apparatus 1 according to the first embodiment will be described using flowcharts of FIGS. 4 and 5.

First, an image (captured image) obtained by imaging the face of the user using the camera 10 is input in step S62. The captured image is then displayed on the display unit 18 in step S64. Then, mode setting may be performed by the user in step S65. Through mode setting, information of a makeup objective or environment such as usual, party, outdoor, or date is input (step S66), so that a makeup pattern having a style suitable for a mode desired by the user is recommended.

On the other hand, if mode setting is not performed by the user (step S65: No), the face parts are recognized from the captured image by the image recognition unit 11 in step S67. Subsequently, the user face information analysis unit 12 analyzes face information from the face parts recognized by the image recognition unit 11 in step S68.

Next, in step S70, a recommended makeup pattern is judged by the recommended makeup pattern judgment unit 13, superimposed on the face of the user and then presented. The recommended makeup pattern judgment unit 13 judges a makeup pattern suitable for the user from the makeup patterns stored in the makeup scheme DB 14, as the recommended makeup pattern, in consideration of the face information output from the user face information analysis unit 12 or a set mode when mode setting is performed by the user. The recommended makeup pattern is displayed on the display unit 18 to be presented to the user. Here, the recommended makeup pattern presented on the display unit 18 may be an image obtained by applying makeup to a face of a model created in advance, like sample images 182*a* to 182*c* shown in FIG. 6.

If a plurality of recommended makeup patterns are presented in step S72 (step S72: Yes), any of the recommended makeup patterns is selected by the user in step S74.

Next, the makeup support apparatus 1 performs a process of displaying an AR image in which a virtual makeup image created from the recommended makeup pattern is superimposed on an image obtained by imaging a face in the real space on the display unit 18 in step S76 (see the AR image 183 shown in FIG. 6). This simulation presenting process (AR image display process) will be described using a flowchart of FIG. 5 later.

Next, if the recommended makeup pattern presented in the simulation is determined by the user in step S78, a makeup action image for the determined makeup pattern is presented in step S80. The makeup action image will be described later with reference to FIG. 8.

On the other hand, if there is no favorite makeup pattern among the presented recommended makeup patterns (step S78: No), subsequent recommended makeup patterns are presented (step S70). For example, if a recommendation list has been generated by the recommended makeup pattern judgment unit 13, the recommended makeup pattern is presented in order from upper makeup patterns in the list. Steps S70 to S78 are iteratively performed until the favorite makeup pattern is selected. Alternatively, the process is performed again from mode setting in step S66.

The process in the makeup support apparatus 1 according to the present embodiment has been described above. Next, the process of presenting the simulation shown in the above-described step S76 will be described with reference to FIG. 5.

Figure 5:
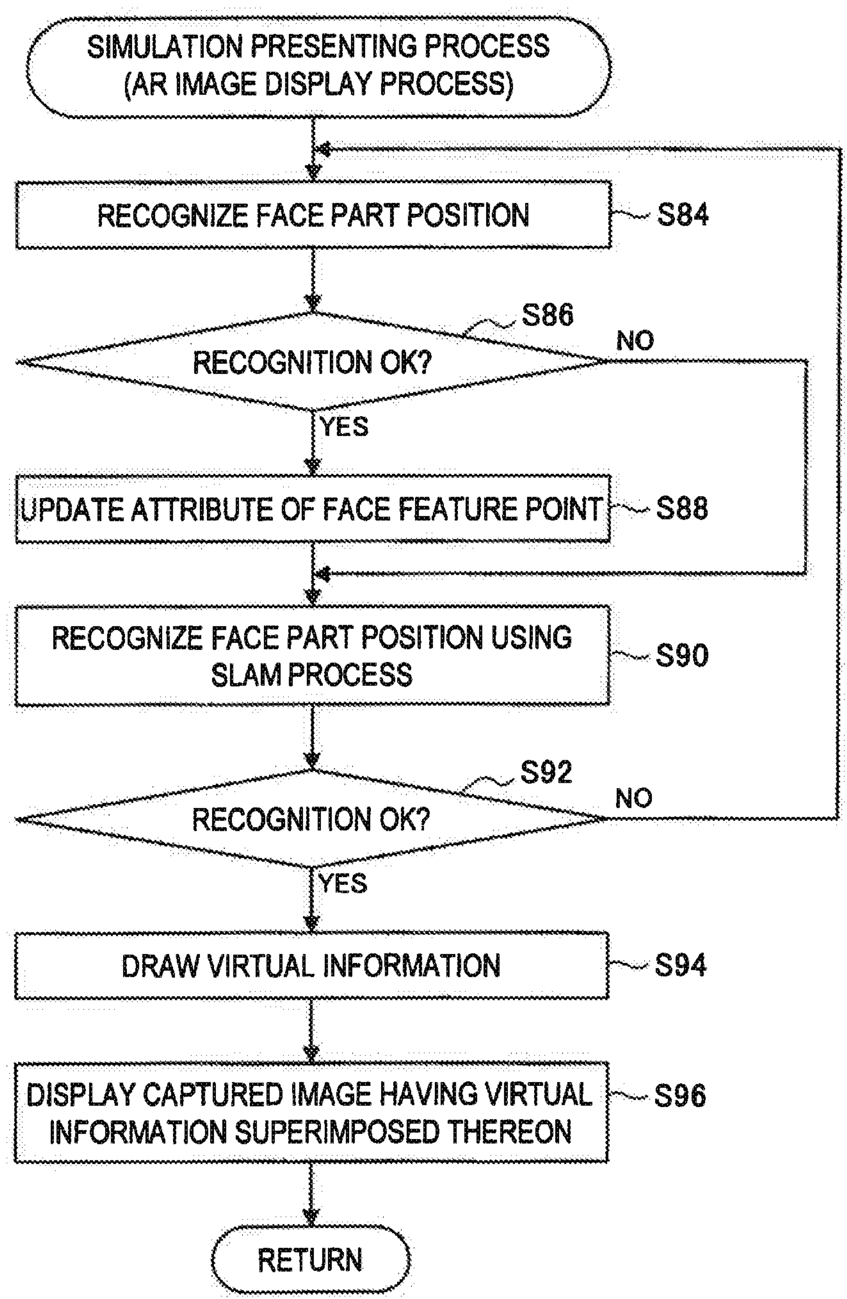
FIG. 5 is a diagram illustrating an example of display control of the makeup support apparatus according to the first embodiment.

First, as shown in FIG. 5, a process of recognizing a face part position from the captured image in the face and part recognition unit 110 is performed in step S84. If the face part position is recognized (step S86: Yes), an attribute of a face feature point is updated in step S88. The face feature point refers to a landmark on an object (in the present embodiment, the face and the face part) that is a recognition target in an image tracked for three-dimensional recognition in the SLAM process.

In step S90, a process of recognizing a three-dimensional position and posture of a face part that is a recognition target in the captured image is performed by the SLAM processing unit 111.

If the position of the face part in the captured image can be recognized through each recognition process (step S92/Yes), a virtual makeup image is generated by the makeup image generation unit 15 in step S94. An AR image in which a makeup image that is virtual information is superimposed on the face of the user that is a captured image of a real space is then displayed in step S96.

The simulation presenting process in the makeup support apparatus 1 according to the present embodiment has been described above. Next, an example of the AR image displayed on the display unit 18 of the makeup support apparatus 1 according to the present embodiment will be described with reference to the accompanying drawings.

(1-4) Example of AR Image

The AR image according to the present embodiment is an image in which a virtual makeup image is superimposed on a captured image obtained by imaging a real space. The superimposed makeup image may be a makeup completion image generated based on the makeup scheme information for the makeup pattern. For example, a virtual makeup completion image 185 is superimposed on the face image 181 of the user, as in the AR image 183 in FIG. 6. Accordingly, the user can confirm a completion state when applying makeup using the recommended makeup pattern, in advance.

The user can also confirm the AR image from several angles. Hereinafter, a description will be given with reference to FIGS. 6 and 7.

Figure 7:
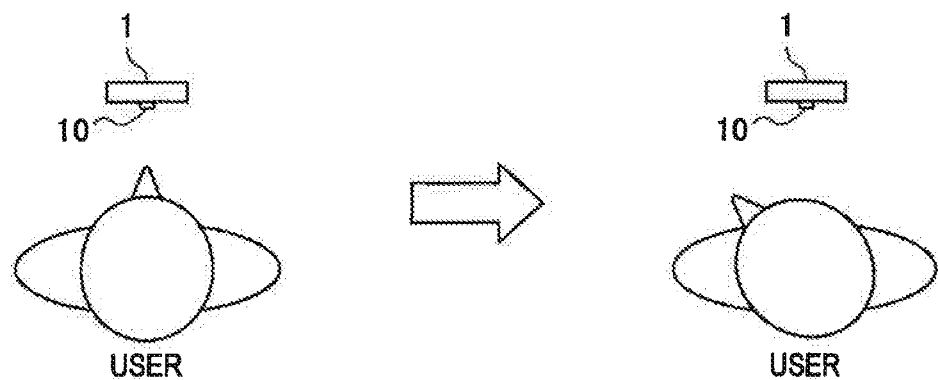
FIG. 7 is a diagram showing an example of makeup scheme information.

If the user desires to confirm a makeup state of the face seen from the side after confirming a makeup state from a front face in the AR image 183 in FIG. 6, for example, the face is directed to the side as shown in FIG. 7. Accordingly, the position and the posture of the face of the user in the image captured by the camera 10 are changed. Here, since the simulation presenting process shown in FIG. 4 is iteratively performed, if the position and the posture of the face of the user in the image are changed, the change can be tracked in real time, such that a position or a shape in which the makeup image that is superimposed virtual information can be changed according to a change of the user in the image. Accordingly, a virtual makeup completion image is displayed with a changed shape by tracking the position of the recognized face part, as shown in the AR image 184 of FIG. 6. Accordingly, the user can recognize the AR image from several angles in real time.

Further, the superimposed virtual makeup image may be a makeup action image generated based on the makeup scheme information of the makeup pattern. For example, in the case of a makeup pattern having a pattern ID "P-00001" in the makeup scheme information shown in FIG. 3, a makeup action image indicating a procedure of process 001; apply cosmetics I-201 to tool T-221 under pressure of 20, and then process 002; apply cosmetics I-201 to face part P-002 (e.g., cheek) by length (length) 21 along a straight line (Motion=2) without deviation (distance=0) under pressure of 12 is superimposed and displayed. The superimposed and displayed makeup action image is displayed in order of the number of the process, but an example of a time at which a makeup action image for a next procedure is displayed will be described in a variant to be described later.

A superimposed position of the makeup action image is changed or transformed according to the change of the position and the posture of the face part of the user in the image (tracking display), similar to the makeup completion image described using FIG. 6. Accordingly, for example, as shown in FIG. 8, a makeup action image 187*a* in which a hand holding an eyebrow pencil moves along a makeup area indicated by a dotted line is changed into a makeup action image 187 according to the change of the position and posture of the face part of the user in the image. That is, the makeup action image tracks the face part. Accordingly, the user can confirm the makeup action image as a makeup model from several angles in real time and can apply makeup more accurately.

The example of the AR image has been described above. Further, the virtual makeup image may be two-dimensional information or three-dimensional information.

(1-5) Variant

Next, a variant of the makeup support apparatus 1 according to the first embodiment described above will be described with reference to FIG. 9. FIG. 9 is a block diagram showing a configuration of a makeup support apparatus according to the present variant. The makeup support apparatus according to the present variant includes a camera 10, an image recognition unit 11, a user face information analysis unit 12, a recommended makeup pattern judgment unit 13, a makeup scheme DB 14, a makeup image generation unit 15, a makeup progress degree judgment unit 16, a display control unit 17, a display unit 18, and a manipulation unit 19, as shown in FIG. 9. The image recognition unit 11 includes a face and part recognition unit 110 and an SLAM processing unit 111.

The makeup progress degree judgment unit 16 compares a recognition result output from the image recognition unit 11 with a previously generated makeup completion image to judge a progress degree of real makeup being applied by the user. The makeup image generation unit 15 modifies the superimposed and displayed makeup action image according to the progress degree output from the makeup progress degree judgment unit 16. The modification may also be based on the steps taken toward completion of the makeup procedure. For example, the makeup image generation unit 15 may modify the superimposed and displayed makeup action image to depict a next step in the makeup procedure to be performed, following a determination that a particular step has been performed. A detailed description of other configurations will be omitted since they are the same as those described above.

According to an example configuration, as the makeup being applied by the user approaches a completion state, portions of the makeup action image can be removed or made transparent, where the removed or transparent portions may correspond to sections of the face where makeup has been applied according to the makeup procedure. Accordingly, the user can visually confirm to what extent the makeup currently being applied is approaching the completion state. Further, a time at which a makeup action image for a next procedure is displayed may be determined according to the progress degree of the makeup being applied by the user. Accordingly, if the makeup according to the shown procedure is completed, the makeup action image for the next procedure is automatically displayed.

For the time at which the makeup action image for the next procedure is displayed as described above, a manipulation of the user may be used as trigger. For example, if the next procedure is instructed to be displayed, the makeup action image for the next procedure is forcibly displayed. Further, the procedure may be skipped by the manipulation of the user. Further, a makeup action image for a face part approached by the hand of the user may be displayed. If changing the procedure according to a makeup procedure is not desirable, an alert indicating that fact may be displayed.

Figure 10:
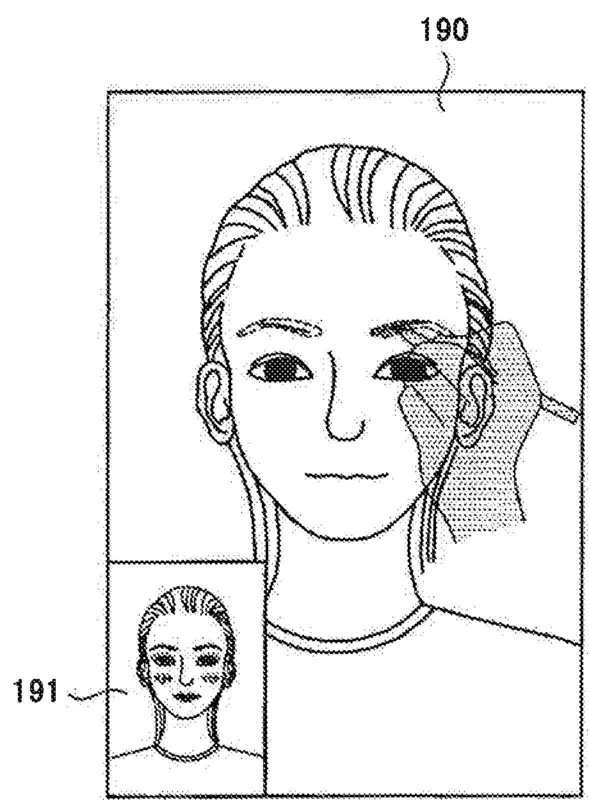
FIG. 10 is a diagram showing a display screen of a makeup support apparatus in variant 2.

Further, as shown in FIG. 10, an image 191 on which the makeup completion image is superimposed may be displayed, in addition to the AR image 190 on which the makeup action image is superimposed. Accordingly, the user can apply makeup while confirming a makeup completion state.

2. Second Embodiment

Next, a makeup support system according to a second embodiment of the present disclosure will be described with reference to FIGS. 1 and 12. According to the present embodiment, makeup service of a desired makeup artist can be received.

Figure 11:
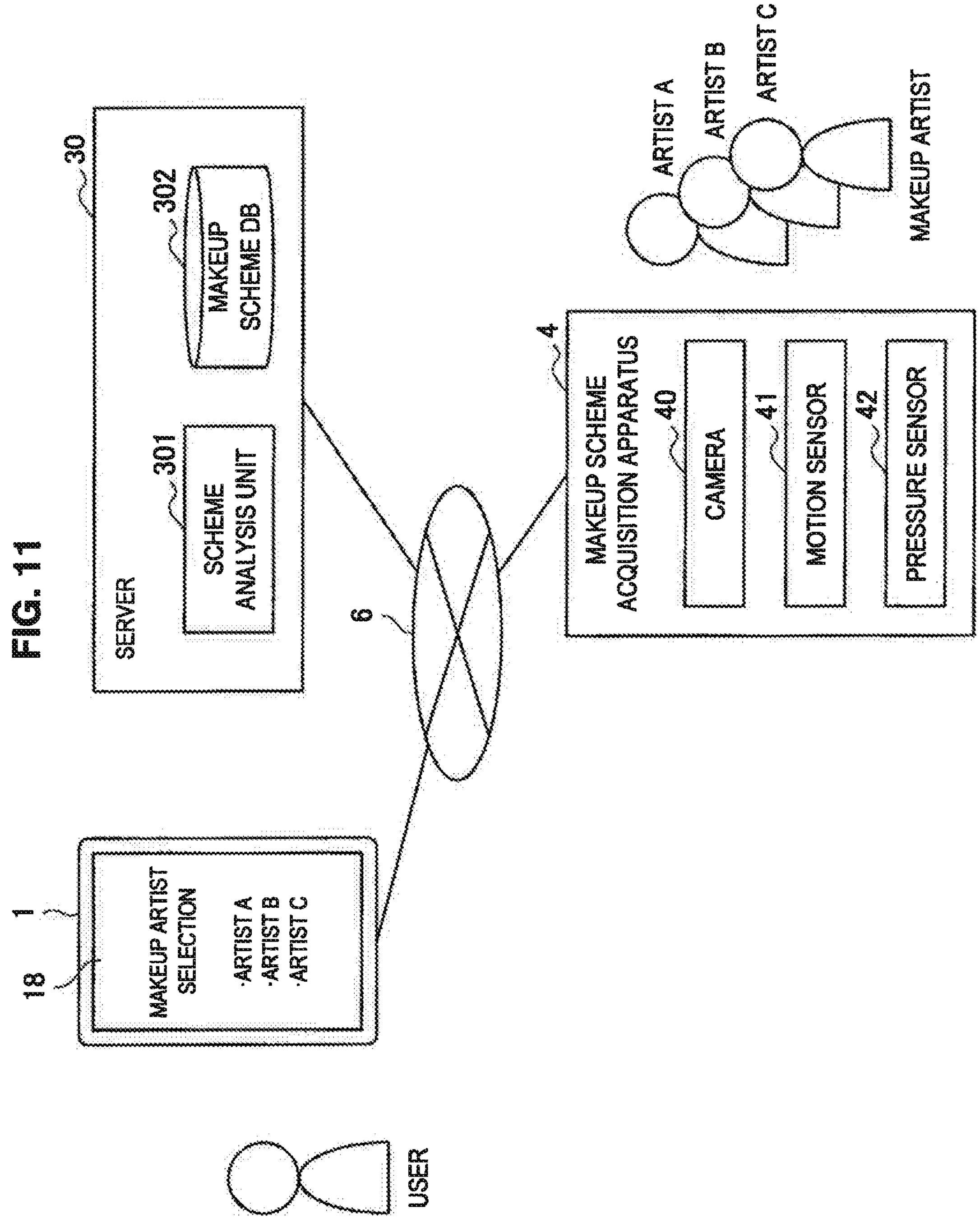
FIG. 11 is a diagram showing an overview of a makeup support system according to a second embodiment.

FIG. 11 is a diagram showing an overview of the makeup support system according to the present embodiment. As shown in FIG. 11, the makeup support system according to the present embodiment includes a makeup support apparatus 1, a server 30, and a makeup scheme acquisition apparatus 4 which are connected via a network 6.

The makeup scheme acquisition apparatus 4 includes various information acquisition units such as a camera 40, a motion sensor 41 and a pressure sensor 42. A makeup scheme of a makeup artist is acquired by such a makeup scheme acquisition apparatus 4 and stored in a makeup scheme DB 302 of the server 30. Specifically, various sensors are attached to the arm or hand of the makeup artist to acquire information such as pressure when a makeup tool contacts cosmetics, pressure when makeup is applied to the face, and a locus. Further, a makeup procedure is imaged by the camera 40. Alternatively, various sensors may be attached to cosmetics, makeup tools, or a mannequin to acquire makeup scheme information of makeup artists. Further, IDs of used cosmetics, or information indicating that a plurality of cosmetics are used together, if any, are input.

The server 30 includes a scheme analysis unit 301 and the makeup scheme DB 302. The scheme analysis unit 301 analyzes a makeup scheme from the various information acquired by the makeup scheme acquisition apparatus 4 and digitizes the makeup scheme with reference to a generalized face image. The makeup scheme DB 302 stores the makeup scheme information analyzed by the scheme analysis unit 301.

Next, a configuration of a makeup support apparatus 1 according to the present embodiment is shown in FIG. 12. As shown in FIG. 12, the makeup support apparatus 1 according to the present embodiment includes a camera 10, an image recognition unit 11, a user face information analysis unit 12, a recommended makeup pattern judgment unit 13, a makeup image generation unit 15, a display control unit 17, a display unit 18, a manipulation unit 19, and a communication unit 20. The image recognition unit 11 includes a face and part recognition unit 110 and an SLAM processing unit 111.

The communication unit 20 establishes a communication connection with the server 30. The communication in the communication unit 20 may be wired or wireless communication, but usually exchanges information with the server 30 using wireless communication such as a wireless LAN or Bluetooth (registered trademark). This enables communication for receiving makeup service of a makeup artist desired by the user. Specifically, the communication unit 20 receives the makeup scheme information from the server 30. A description of other configurations will be omitted since they are the same as those of the makeup support apparatus 1 according to the first embodiment.

As described above, the makeup scheme information acquired from each makeup artist is stored in the makeup scheme DB 302 of the server 30. On the other hand, in the makeup support apparatus 1, a list of selectable makeup artists is displayed on the display unit 18, as shown in FIG. 11, and makeup scheme information of the artist selected by the user is acquired from the server 30. Accordingly, a recommended makeup pattern judgment unit of the makeup support apparatus 1 can judge a makeup pattern suitable for the user from makeup patterns based on the makeup scheme information of the makeup artist desired by the user.

Further, in the present embodiment, since at least the makeup scheme information acquired from the makeup artist may be stored in the makeup scheme DB, the makeup scheme acquisition apparatus 4 shown in FIG. 11 is not necessarily an indispensable component.

3. Third Embodiment

Next, a makeup support system according to a third embodiment of the present disclosure will be described with reference to FIGS. 13 and 14. According to the present embodiment, makeup scheme information can be exchanged among users.

Figure 13:
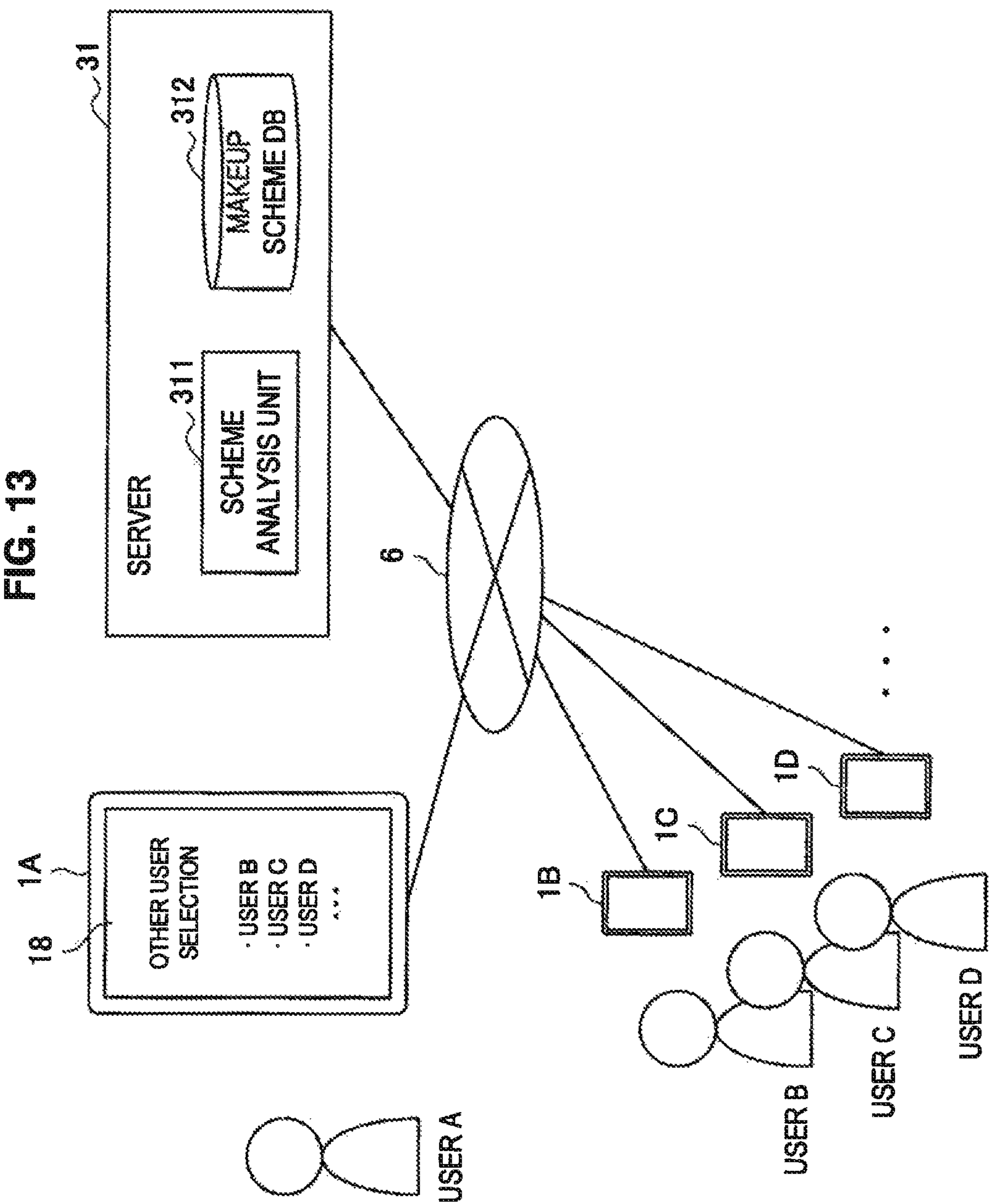
FIG. 13 is a diagram showing an overview of a makeup support system according to a third embodiment.

FIG. 13 is a diagram showing an overview of a makeup support system according to the present embodiment. As shown in FIG. 13, the makeup support system according to the present embodiment includes makeup support apparatuses 1A to 1D for respective users and a server 31, which are connected via a network 6.

Figure 14:
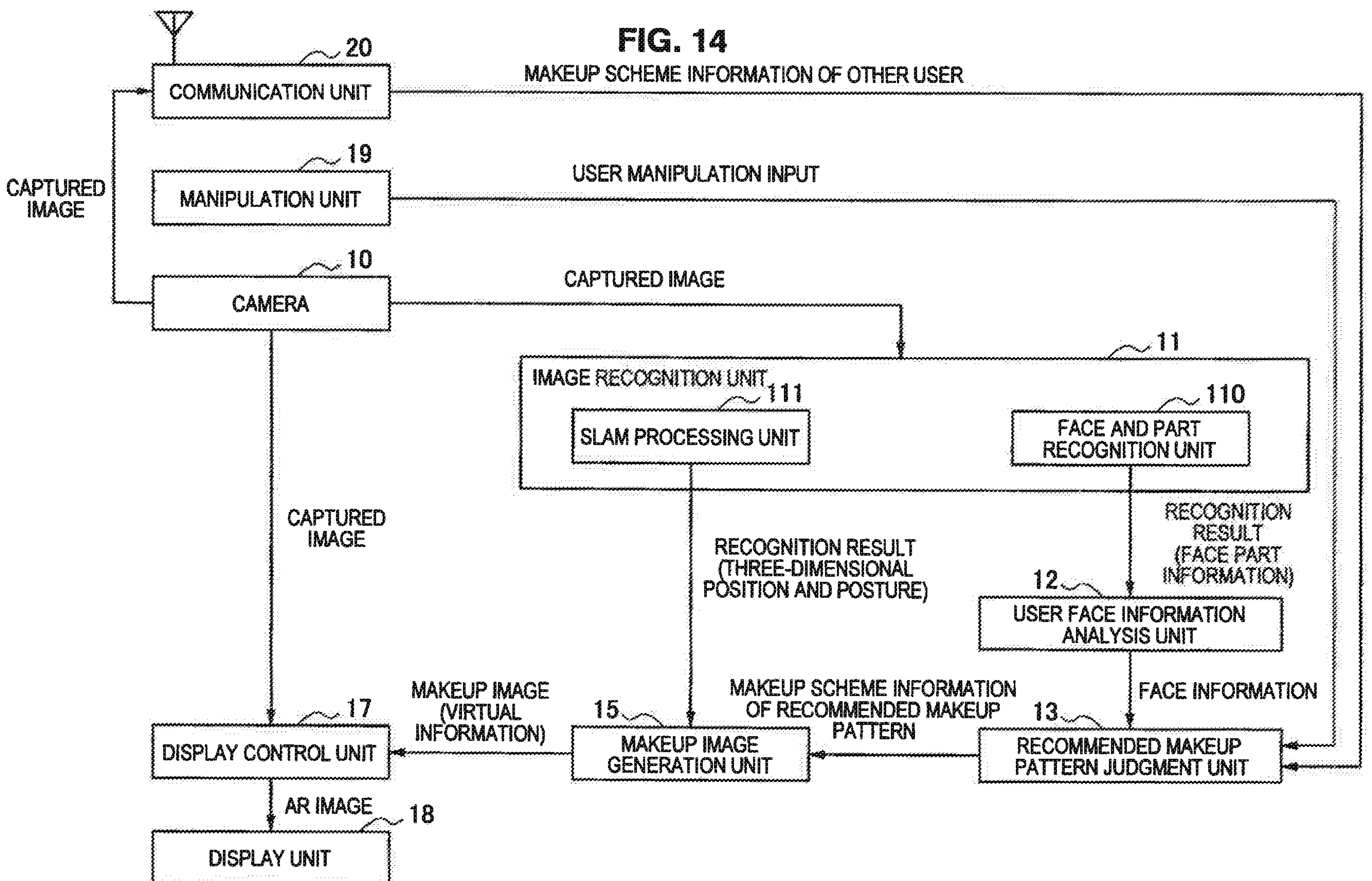
FIG. 14 is a diagram showing an example of a configuration of the makeup support apparatus according to the third embodiment.

A configuration of the makeup support apparatus 1 according to the present embodiment is shown in FIG. 14. As shown in FIG. 14, the makeup support apparatus 1 according to the present embodiment includes a camera 10, an image recognition unit 11, a user face information analysis unit 12, a recommended makeup pattern judgment unit 13, a makeup image generation unit 15, a display control unit 17, a display unit 18, a manipulation unit 19 and a communication unit 20. The image recognition unit 11 includes a face and part recognition unit 110 and an SLAM processing unit 111.

The camera 10 acquires an image of makeup done by a user and outputs the image to the communication unit 20. The communication unit 20 establishes a communication connection with the server 30 and transmits the captured image output from the camera 10 to the server 30. Further, the communication unit 20 receives makeup scheme information of other users from the makeup scheme DB 312 of the server 30. This makes it possible to exchange the makeup scheme information with the other users. The recommended makeup pattern judgment unit 13 judges a makeup pattern suitable for the user from the makeup patterns based on the makeup scheme information of the other users acquired by the communication unit 20. A description of other configurations will be omitted since they are the same as those of the makeup support apparatus 1 according to the first embodiment.

The server 31 includes a scheme analysis unit 311 and a makeup scheme DB 312. The scheme analysis unit 311 analyzes a makeup scheme from the captured image obtained by imaging a makeup action of the user transmitted from each makeup support apparatus 1, and digitizes the makeup scheme with reference to a generalized face image. The scheme analysis unit 311, for example, compares a professional's makeup action image or a reference makeup action image with the makeup action image of the user to calculate a difference therebetween, and digitizes the makeup scheme. The makeup scheme DB 312 stores the makeup scheme information analyzed by the scheme analysis unit 311.

Alternatively, the makeup support apparatus 1 may include various sensors such as motion sensors and pressure sensors, and transmit information acquired by the various sensors when the user applies makeup to the server 31. In this case, the scheme analysis unit 311 analyzes a makeup scheme from various information transmitted from the makeup support apparatus 1 and digitizes the makeup scheme with reference to a generalized face image.

As described above, the makeup scheme information acquired from each user is stored in the makeup scheme DB 312 of the server 31. Meanwhile, in the makeup support apparatus 1A, a list of other selectable users is displayed on the display unit 18, as shown in FIG. 13, and the makeup scheme information of the other user selected by the user is acquired from the server 31. Accordingly, the recommended makeup pattern judgment unit of the makeup support apparatus 1 can judge a makeup pattern suitable for the user from the makeup patterns based on the makeup scheme information of the other user, such as a friend of the user. Accordingly, the makeup support system can be further utilized, such as friendly competition in the makeup scheme with friends, imitating makeup schemes of other users, or being famous among nonprofessional amateurs.

4. Fourth Embodiment

Next, a makeup support system according to a fourth embodiment of the present disclosure will be described with reference to FIGS. 15 and 16. According to the present embodiment, information of appropriate cosmetics and cosmetics sale service can be provided.

Figure 15:
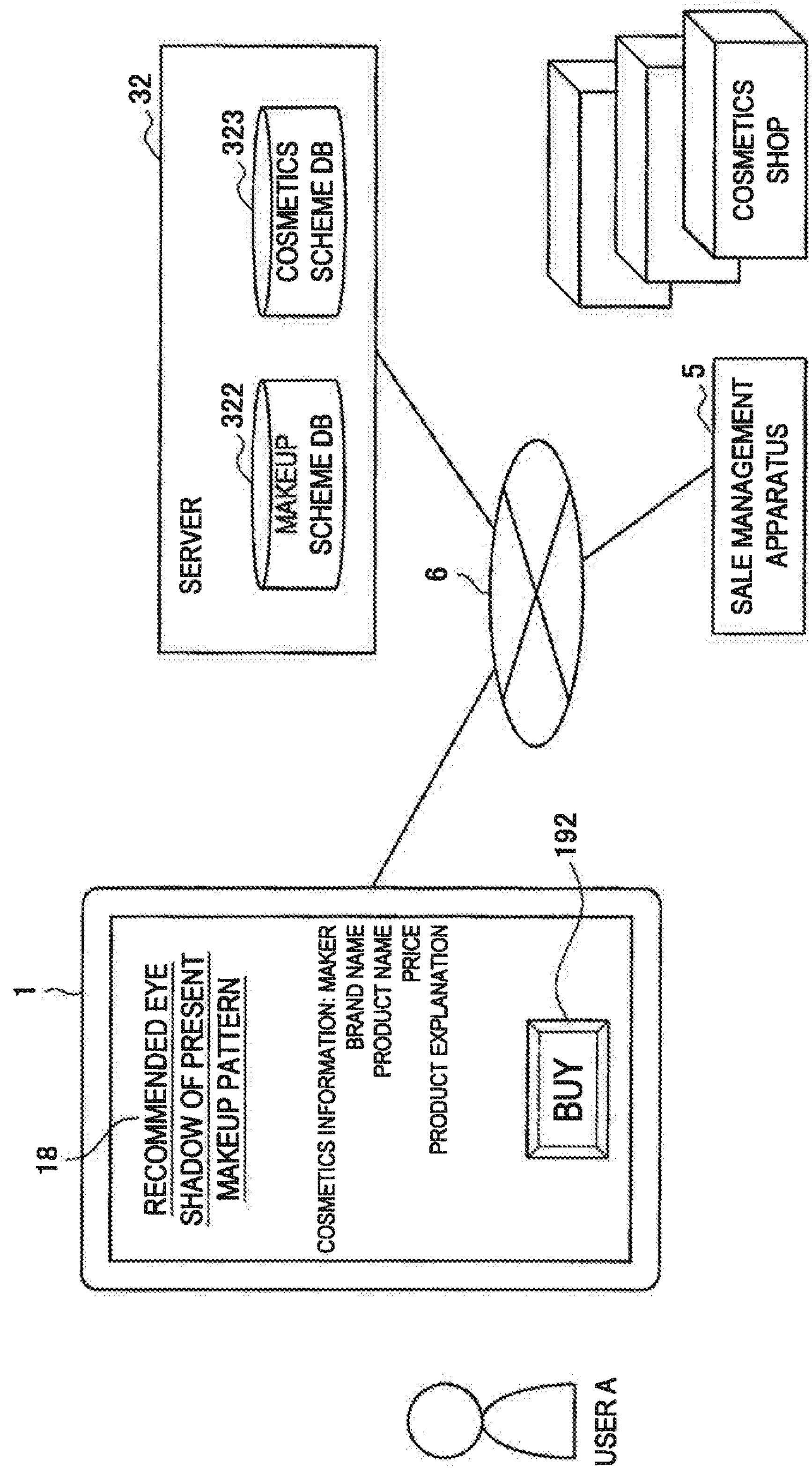
FIG. 15 is a diagram showing an overview of a makeup support system according to a fourth embodiment.

FIG. 15 is a diagram showing an overview of the makeup support system according to the present embodiment. As shown in FIG. 15, the makeup support system according to the present embodiment includes a makeup support apparatus 1, a server 32 and a sale management apparatus 5 for each cosmetics shop, which are connected via a network 6.

Figure 16:
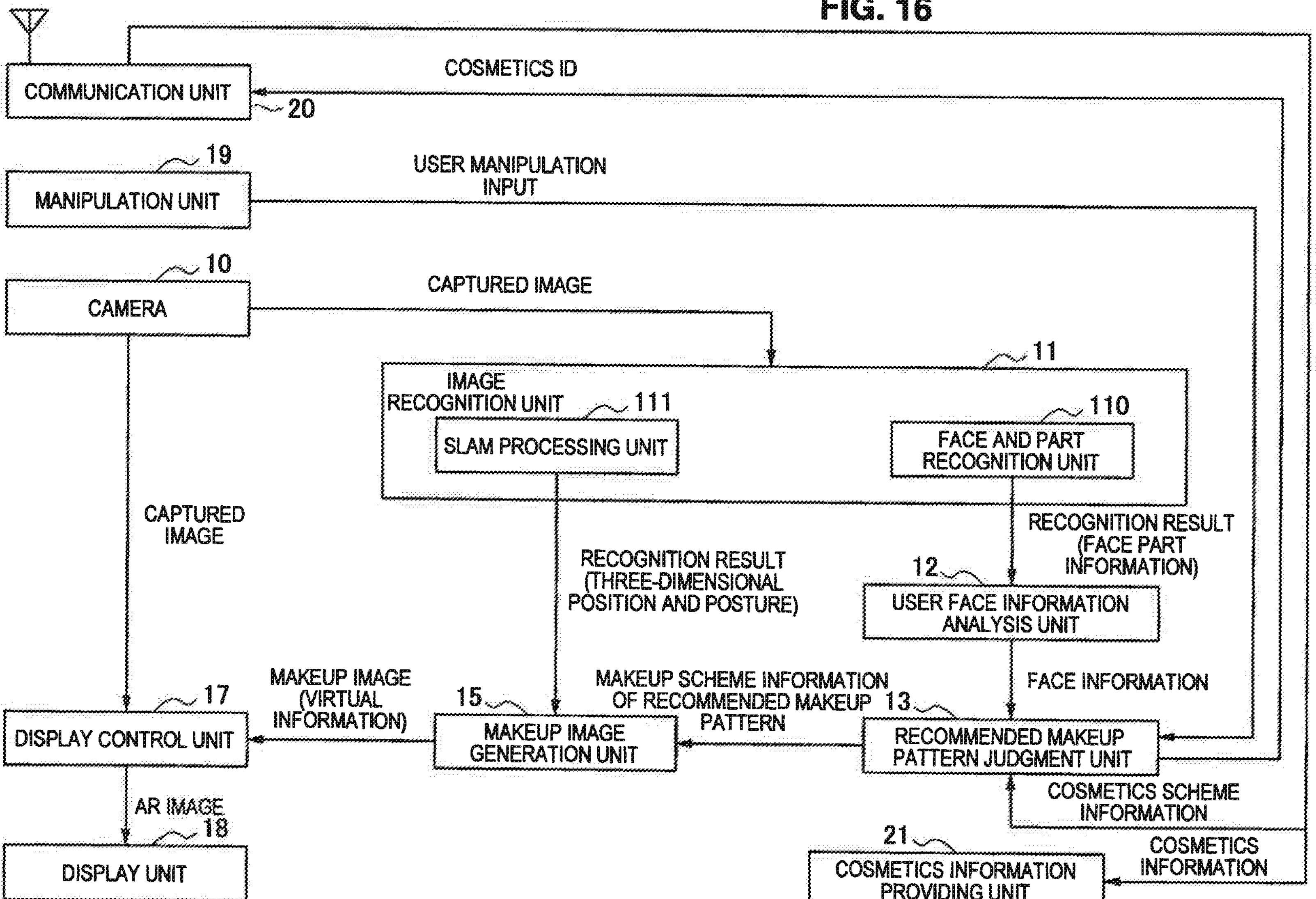
FIG. 16 is a diagram showing an example of a configuration of the makeup support apparatus according to the fourth embodiment.

A configuration of the makeup support apparatus 1 according to the present embodiment is shown in FIG. 16. As shown in FIG. 16, the makeup support apparatus 1 according to the present embodiment includes a camera 10, an image recognition unit 11, a user face information analysis unit 12, a recommended makeup pattern judgment unit 13, a makeup image generation unit 15, a display control unit 17, a display unit 18, a manipulation unit 19, a communication unit 20, and a cosmetics information providing unit 21. The image recognition unit 11 includes a face and part recognition unit 110 and an SLAM processing unit 111.

The communication unit 20 establishes a communication connection with the server 32 and exchanges information with the server 32. Specifically, the communication unit 20 performs reception of makeup scheme information, transmission of a makeup ID, and reception of cosmetics information from/to the server 32.

The recommended makeup pattern judgment unit 13 judges a recommended makeup pattern based on the makeup scheme information received by the communication unit 20. Further, the recommended makeup pattern judgment unit 13 outputs a cosmetics ID (see FIG. 7) of a makeup pattern judged to be a recommended makeup pattern to the server 32 via the communication unit 20.

The cosmetics information providing unit 21 provides the user with the cosmetics information transmitted from the server 32 according to the cosmetics ID output from the makeup recommended pattern judgment unit 13. For example, maker, brand name, product name, price, product explanation and the like are displayed as cosmetics information on the display unit 18, as shown in FIG. 15. Accordingly, information of appropriate cosmetics to be used when the makeup based on the recommended makeup pattern is applied by the user is provided. Further, as shown in FIG. 15, a buy button 192 is displayed together with the cosmetics information on the display unit 18, such that the user can easily perform a procedure of purchasing appropriate cosmetics.

A description of other configurations of the makeup support apparatus 1 according to the present embodiment will be omitted since they are the same as those of the makeup support apparatus 1 according to the first embodiment.

The server 32 includes a makeup scheme DB 322 and a cosmetics information DB 323. The makeup scheme DB 322 stores the makeup scheme information, similar to the makeup scheme DB in each embodiment described above. The makeup information DB 323 stores cosmetics information corresponding to each cosmetics ID contained in the makeup scheme information stored in the makeup scheme DB 322.

The sale management apparatus 5 performs product sale management according to a cosmetics purchase request from the makeup support apparatus 1. The sale management apparatus 5 may be owned by each cosmetics shop. Alternatively, a normal net sale system (online shopping) may be used.

As described above, the makeup support apparatus 1 according to the present embodiment sells cosmetics necessary for the user to realize the recommended makeup pattern to thereby perform makeup support.

5. Fifth Embodiment

Next, a makeup support system according to a fifth embodiment of the present disclosure will be described. A makeup support apparatus 1 according to the present embodiment judges a recommended makeup pattern in consideration of effects of makeup on skin.

Specifically, skin quality, skin texture and the like that are ideal, for example, after five years or ten years are set (a predicted value of a future face image), and skin quality, skin texture and the like (a predicted value of a current face image), for example, after five years or ten years predicted from current face information are calculated to judge a makeup pattern that hides the differences therebetween as the recommended makeup pattern. In addition to current face information, information having an influence on the skin, such as age, sex, race, and life pattern, may be input by the user.

Accordingly, from a long-term view, a makeup pattern considering temporal changes of the skin can be recommended

6. Sixth Embodiment

Next, a makeup support system according to a sixth embodiment of the present disclosure will be described. In a makeup support apparatus 1 according to the present embodiment, a user's favorite face image such as a face photograph of an entertainer is input by the user, and a makeup pattern causing the face of the user to be as close as possible to the user's favorite face is judged to be a recommended makeup pattern from an analysis result for the face image and the face information of the user.

Accordingly, a makeup pattern close to the user's favorite face can be recommended.

7. SUMMARY

As described above, the makeup support apparatus 1 according to the embodiment of the present disclosure performs simulation of a state after makeup completion using the AR technology, thereby improving the makeup support scheme. Further, a procedure during makeup application is displayed using the AR technology, thereby further improving the makeup support scheme.

In the respective embodiments described above, all the processes are performed in the makeup support apparatus 1, but the present disclosure is not limited to such examples. For example, a process with a heavy load among the processes performed in the makeup support apparatus 1 may be performed by the server connected via the network, or performed in a distributive manner via remote devices or servers in, for example, a cloud computing configuration. For example, the captured image captured by the camera 10 may be transmitted from the makeup support apparatus 1 to the server, and user face information of the captured image may be analyzed by the server to judge a recommended makeup pattern. In this case, the server transmits the makeup scheme information of the makeup pattern judged to be the recommended makeup pattern from the captured image transmitted from the makeup support apparatus 1, to the makeup support apparatus 1. Further, the server may generate the makeup image from the recommended makeup pattern and transmit the makeup image to the makeup support apparatus 1. Further, the makeup scheme DB 14 for storing the makeup scheme information may be disposed in the server.

As the process with a heavy load is performed by the server as described above, power consumption of the makeup support apparatus 1 can be reduced and hardware resources necessary for the makeup support apparatus 1 can be reduced. Further, if the makeup scheme DB 14 for storing the makeup schemes is disposed in the server, storage capacity of the makeup support apparatus 1 can be reduced and the same makeup scheme information can be easily used or managed between makeup support apparatuses.

The embodiments of the present disclosure have been described in detail with reference to the accompanying drawings, but the present disclosure is not limited to such examples. It should be understood by those skilled in the art that various modifications, combinations, sub-combinations and alterations may occur depending on design requirements and other factors insofar as they are within the scope of the appended claims or the equivalents thereof. Also, any reference in the claims to articles, such as "a" or "an," is to be construed as meaning "one or more."

For example, the present technology can adopt the following configurations.

(1) An information processing apparatus comprising:

an imaging unit for capturing an image;

an image recognition unit for sequentially acquiring images from the imaging unit and recognizing parts of a face in the acquired image; and a display control unit for displaying a virtual makeup image tracking the face in the image based on a position of the face parts contained in a recognition result output from the image recognition unit, the virtual makeup image being superimposed on the image.

(2) The information processing apparatus according to the (1), wherein the display control unit displays a makeup completion image as the virtual makeup image.

(3) The information processing apparatus according to the (1), wherein the display control unit displays a makeup action image as the virtual makeup image.

(4) The information processing apparatus according to any one of the (1) to (3), further comprising an image generation unit for generating the virtual makeup image based on makeup scheme information.

(5) The information processing apparatus according to the (4), further comprising:

an analysis unit for analyzing face information based on the recognition result output from the image recognition unit; and a recommended makeup pattern judgment unit for judging a recommended makeup pattern according to an analysis result output from the analysis unit, wherein the makeup pattern includes the makeup scheme information, and wherein the image generation unit generates the virtual makeup image based on makeup scheme information of a makeup pattern judged to be a recommended makeup pattern by the recommended makeup pattern judgment unit.

(6) The information processing apparatus according to the (4) or (5), further comprising:

a makeup progress degree judgment unit for judging a makeup progress degree by comparing the image captured by the imaging unit with a previously generated makeup completion image, wherein the display control unit sequentially displays makeup action images to be superimposed on the image, the makeup action images being changed according to a judgment result from the makeup progress degree judgment unit.

(7) The information processing apparatus according to the (6), wherein order of the makeup action images sequentially displayed by the display control unit is changed according to a manipulation of the user.

(8) An information processing method comprising:

capturing an image;

sequentially acquiring images through the capturing step and recognizing parts of a face in the acquired image; and displaying a virtual makeup image tracking the face in the image based on a position of the face parts contained in a recognition result output in the recognition step, the virtual makeup image being superimposed on the image.

(9) An information processing system comprising:

an information processing apparatus including an imaging unit for capturing an image, an image recognition unit for sequentially acquiring images from the imaging unit and recognizing parts of a face in the acquired image, and a display control unit for displaying a virtual makeup image tracking the face in the image based on a position of the face parts contained in a recognition result output from the image recognition unit, the virtual makeup image being superimposed on the image; and a server including an analysis unit for analyzing face information based on the recognition result output from the image recognition unit, and a recommended makeup pattern judgment unit for judging a recommended makeup pattern according to an analysis result output from the analysis unit, wherein the information processing apparatus generates the virtual makeup image based on makeup scheme information of the recommended makeup pattern acquired from the server.

(10) A program for causing a computer to function as an information processing apparatus comprising:

an imaging unit for capturing an image;

an image recognition unit for sequentially acquiring images from the imaging unit and recognizing parts of a face in the acquired image; and a display control unit for displaying a virtual makeup image tracking the face in the image based on a position of the face parts contained in a recognition result output from the image recognition unit, the virtual makeup image being superimposed on the image.

What is claimed is:

1. An augmented reality makeup support technology apparatus comprising:

circuitry configured to:

acquire, from sensors attached to cosmetic products, cosmetics information of the cosmetic products used by each makeup artist of a plurality of makeup artists and an order in which the cosmetics products are used by a respective makeup artist of the plurality of makeup artists;

store, in a database and for each makeup artist of the plurality of makeup artists, makeup scheme information of a makeup pattern including the cosmetics information of the cosmetic products used by the respective makeup artist and a process number identifying the order in which the cosmetics products are used by the respective makeup artist, the cosmetics information being associated with the process number in the database;

control a display to display the plurality of makeup artists for selection by a user;

acquire makeup scheme information of a selected makeup artist selected from the plurality of makeup artists;

generate a makeup action image based on the makeup scheme information of the selected makeup artist; and control the display to display the makeup action image by superimposing the makeup action image on a face image of a face of the user.

2. The augmented reality makeup support technology apparatus according to claim 1, wherein the database further stores a makeup procedure which is acquired by a camera and an action sensor attached to the selected makeup artist.

3. The augmented reality makeup support technology apparatus according to claim 2, wherein the action sensor is attached to an arm or hand of the selected makeup artist, and wherein the action sensor acquires pressure information based on contact by makeup tools upon the cosmetic products or skin.

4. The augmented reality makeup support technology apparatus according to claim 1, wherein the database further stores a makeup procedure which is acquired by one or more sensors attached to a mannequin.

5. The augmented reality makeup support technology apparatus according to claim 1, wherein the database further stores a makeup procedure which is acquired by one or more sensors attached to makeup tools.

6. The augmented reality makeup support technology apparatus according to claim 1, wherein the makeup action image is displayed to be overlaid on the face image of the user and refers to a makeup procedure done by the selected makeup artist.

7. The augmented reality makeup support technology apparatus according to claim 1, wherein the cosmetics information comprises at least one of a maker, a brand name, a product name, a price, and a product explanation.

8. The augmented reality makeup support technology apparatus according to claim 1, wherein the cosmetics information provides information of appropriate cosmetics to be used when makeup based on the makeup scheme information is applied by the user.

9. The augmented reality makeup support technology apparatus according to claim 1, further comprising:

a camera configured to capture an image of a new makeup scheme of the user.

10. The augmented reality makeup support technology apparatus according to claim 9, wherein the circuitry is further configured to:

initiate transmission of the captured image of the new makeup scheme of the user to a server that stores the database thereon.

11. The augmented reality makeup support technology apparatus according to claim 1, wherein the circuitry is further configured to:

control the display to display at least one makeup scheme provided by each makeup artist of the plurality of makeup artists.

12. The augmented reality makeup support technology apparatus according to claim 1, wherein the circuitry is further configured to:

acquire more than one makeup scheme information from the selected makeup artist.

13. The augmented reality makeup support technology apparatus according to claim 1, wherein the circuitry is further configured to:

obtain makeup scheme information of other users; and determine a makeup pattern as a suitable makeup pattern based on a comparison with the makeup scheme information of other users.

14. The augmented reality makeup support technology apparatus according to claim 1, wherein the circuitry is further configured to:

determine a progress degree of real makeup being applied by the user based on a comparison between an image of the face image of the user when the user is applying makeup and a makeup completion image indicating a makeup completion state and generated based on the makeup scheme information of the selected makeup artist;

modify the makeup action image based on the determined progress degree and the order in which the cosmetics products are used by the selected makeup artist; and control the display to display the modified makeup action image.

15. The augmented reality makeup support technology apparatus according to claim 14, wherein the modified makeup action image includes portions of the makeup action image removed or made transparent based on the determined progress degree.

16. The augmented reality makeup support technology apparatus according to claim 14, wherein the makeup scheme information includes a makeup procedure including an order of a plurality of procedures done by the selected makeup artist to generate the makeup completion image, and the determined progress degree indicates procedures of the plurality of procedures which have been completed.

17. The augmented reality makeup support technology apparatus according to claim 16, wherein the makeup action image indicates one procedure of the plurality of procedures and the modified makeup action image indicates another procedure of the plurality of procedures.

18. The augmented reality makeup support technology apparatus according to claim 17, wherein the order in the makeup procedure includes the one procedure and then the another procedure.

19. The augmented reality makeup support technology apparatus according to claim 1, wherein the circuitry is further configured to:

control the display to display a buy button in conjunction with the cosmetics information, the buy button provided for making a purchase of corresponding cosmetics.

20. An augmented reality makeup support technology method executed using at least one processor, the method comprising:

acquiring, from sensors attached to cosmetic products, cosmetics information of the cosmetic products used by each makeup artist of a plurality of makeup artists and an order in which the cosmetics products are used by a respective makeup artist of the plurality of makeup artists;

storing, for each makeup artist of the plurality of makeup artists, makeup scheme information of a makeup pattern including the cosmetics information of the cosmetic products used by the respective makeup artist and a process number identifying the order in which the cosmetics products are used by the respective makeup artist, the cosmetics information being associated with the process number in the database;

displaying the plurality of makeup artists for selection by a user;

acquiring makeup scheme information of a selected makeup artist from the plurality of makeup artists;

generating a makeup action image based on the makeup scheme information of the selected makeup artist; and displaying the makeup action image by superimposing the makeup action image on a face image of a face of the user.

21. A non-transitory computer-readable medium having embodied thereon a program, which when executed by a computer causes the computer to execute a method, the method comprising:

acquiring, from sensors attached to cosmetic products, cosmetics information of the cosmetic products used by each makeup artist of a plurality of makeup artists and an order in which the cosmetics products are used by a respective makeup artist of the plurality of makeup artists;

storing, for each makeup artist of the plurality of makeup artists, makeup scheme information of a makeup pattern including the cosmetics information of the cosmetic products used by the respective makeup artist and a process number identifying the order in which the cosmetics products are used by the respective makeup artist, the cosmetics information being associated with the process number in the database;

displaying the plurality of makeup artists for selection by a user;

acquiring makeup scheme information of a selected makeup artist from the plurality of makeup artists;

generating a makeup action image based on the makeup scheme information of the selected makeup artist; and displaying the makeup action image by superimposing the makeup action image on a face image of a face of the user.

* * * * *